April 28, 1959 M. B. MANLEY 2,884,220
EYE GLASS HOLDER
Filed Sept. 23, 1957

INVENTOR.
MARION B. MANLEY
BY James J. Cannon

United States Patent Office 2,884,220
Patented Apr. 28, 1959

2,884,220

EYE GLASS HOLDER

Marion B. Manley, New York, N.Y.

Application September 23, 1957, Serial No. 685,643

1 Claim. (Cl. 248—309)

This invention relates to a support for eyeglasses and more particularly, to a support which is adapted for mounting on a wall.

Unlike soap dish holders, toothbrush holders and wall glass supports, there is presently no provision made for the safe placement of eyeglasses in the bathroom. It being usually necessary to remove the glasses during washing, there is always the possibility that the glasses will fall and break when placed at the edge of a sink or on a sill. Moreover, pools of water collect even at the edge of a sink and if the glasses are placed thereon, the lens will become wet and perhaps covered with a difficult to remove film of soap.

It is therefore amongst the objects of the present invention to provide a wall support whereupon a pair of glasses may be safely placed.

It is another object of the present invention to provide a wall support for eyeglasses particularly suitable for mounting in the bathroom.

It is still another object of the present invention to provide a molded one-piece wall support of tile for eyeglasses.

Briefly stated, the wall support of the present invention comprises a base member for attachment to a wall, spaced lens holders extending from said base member, a nose piece support extending from said base member intermediate of the spaced lens holders, said lens holders and nose piece support extending outwardly with relation to mounting.

Figure 1:
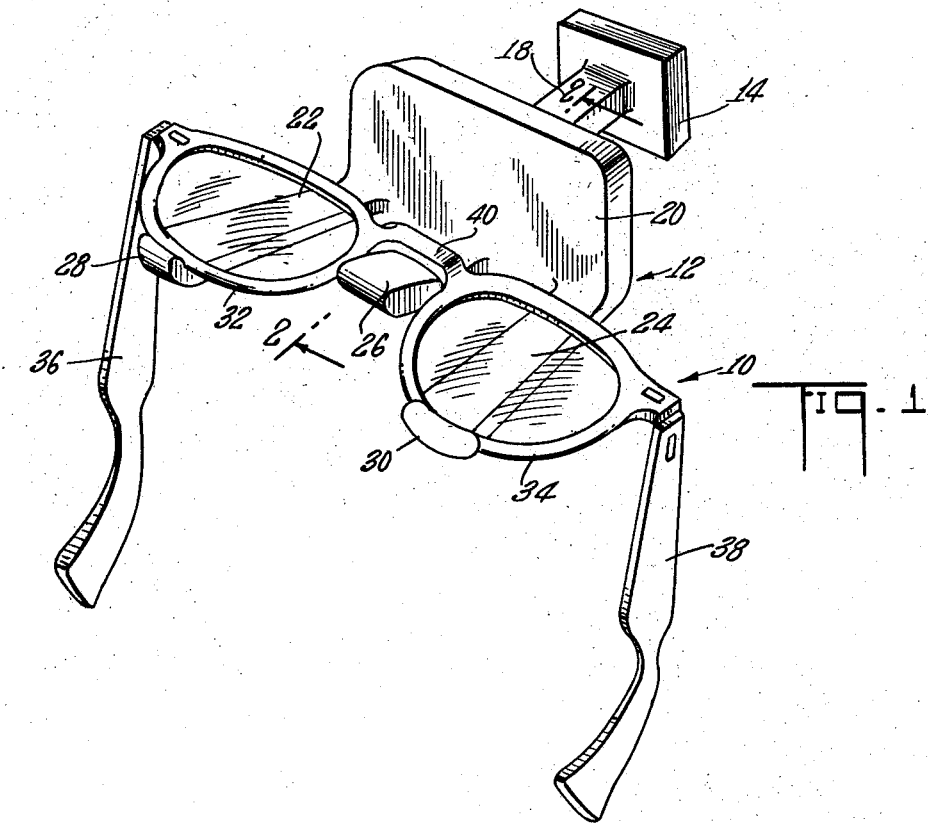
Figure 2:
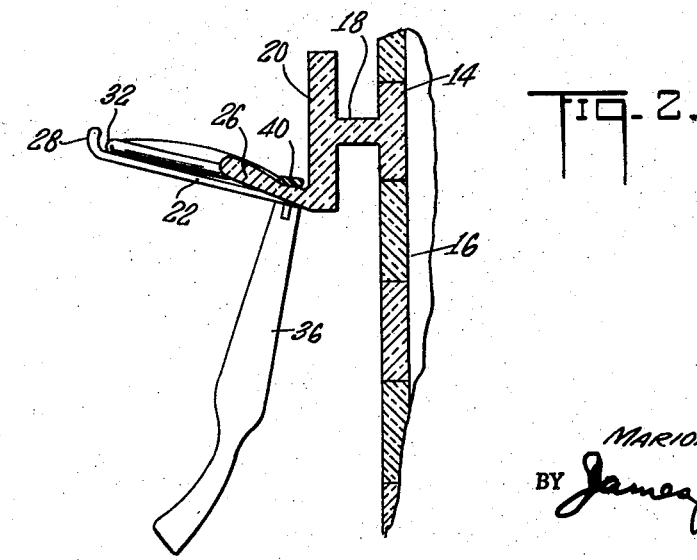

A fuller understanding of the invention and the manner in which its objectives and advantages may be realized will become apparent from the following detailed description thereof taken in conjunction with the accompanying drawing wherein:

Fig. 1 is a perspective view showing a pair of glasses hanging from a wall support in accordance with the present invention; and Fig. 2 is a sectional view taken on line 2—2 of Fig. 1 in the direction of the arrows.

In Fig. 1 a pair of eyeglasses 10 are shown hanging from a wall support 12 made in accordance with the present invention. In this particular embodiment of the present invention, the wall support includes base member or tile 14 which is adhered to wall 16 and constitutes one of a large plurality of tiles covering said wall.

Member 18 extending from base member 14 supports the remainder of the device which includes member 20 from which similarly shaped lens supports 22 and 24 extend. Nose piece support 26, a shorted member positioned intermediate of members 22 and 24, also extends from member 20. Stops 28 and 30 are formed by the upturned ends of members 22 and 24.

As is evident in the drawing, the nose piece support 26 and lens supports 22 and 24 are slightly inclined in an upward direction to tilt the glasses away from the free end of the support. Nose piece support 26 extends slightly above lens supports 22 and 24 and keeps the easily damaged lenses out of contact with possibly abrasive surfaces for the most part. Additionally, stops 28 and 30, shaped to receive the lower edges of frame portions 32 and 34, act to hold the glasses 10 reliably on the support 12.

In practice, the glasses are removed from the face with hinged arms 36 and 38 in extended position. Nose piece 40 is placed upon nose piece support 26 with arms 36 and 38 extending downwardly. If the nose piece 40 is properly positioned on its support 26, lenses 42 and 44 will be supported above members 22 and 24.

As has been stated hereinbefore, if the eyeglass support of the present invention is to be utilized in a bathroom, it is preferable that it be a one-piece molded tile unit. If such is the case, the base tile 14 is cemented to the bathroom wall along with the conventional tile blocks. Of course, the support need not be of tile and need not be cemented or adhered to a supporting wall. The affixation of the base member to the supporting wall can be carried out by threaded bolts, screw and the like.

It may therefore be seen that by virtue of the present invention, a particularly practical wall support has been devised for eyeglasses.

I have thus described my invention but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claim, and by means of which objects of my invention are attained and new results accomplished, as it is obvious that the particular embodiment herein shown and described is only one of several that can be employed to attain these objects and accomplish these results.

What is claimed as new and desired to be secured by Letters Patent is:

A wall attachment for supporting eyeglasses in an inverted position, comprising a base, or tile, a member extending horizontally from said base, at the opposite end of said horizontal member is a larger member, said larger member being parallel to said base, said larger member having supports protruding from the extremities of the bottom of said larger member and at a slight upward incline, and extending for a considerable distance from said larger member, said supports having stops at the free ends thereof, a further and a smaller support protruding from the center bottom of said larger member at an elevation slightly above said outer supports, and also at a slight upward incline.

References Cited in the file of this patent

UNITED STATES PATENTS

| | | |
|---|---|---|
| 1,726,221 | Gilfillan | Aug. 27, 1929 |
| 2,411,361 | Bongiovanni | Nov. 19, 1946 |
| 2,467,251 | Bowman | Apr. 12, 1949 |